United States Patent [19]
Roberts

[11] Patent Number: 5,472,553
[45] Date of Patent: Dec. 5, 1995

[54] FILAMENT CUTTING AND PLACEMENT SYSTEM

[75] Inventor: Robert M. Roberts, Elkton, Md.

[73] Assignee: The Boeing Company, Seattle, Wash.

[21] Appl. No.: 174,309

[22] Filed: Dec. 30, 1993

[51] Int. Cl.$^6$ ............................. B26D 5/00; B32B 31/00
[52] U.S. Cl. .................... 156/353; 156/361; 156/362; 156/494; 156/517; 156/523
[58] Field of Search ....................... 156/353, 361, 156/362, 433, 434, 494, 516, 517, 523

[56] References Cited

U.S. PATENT DOCUMENTS

| | | | |
|---|---|---|---|
| 3,306,797 | 2/1967 | Boggs | 156/494 X |
| 3,910,475 | 10/1975 | Pundsack et al. | 226/6 |
| 4,155,791 | 5/1979 | Higuchi | 156/494 X |
| 4,295,912 | 10/1981 | Burns | 156/324 |
| 4,560,434 | 12/1985 | Sato | 156/494 X |
| 4,790,898 | 12/1988 | Woods | 156/353 X |
| 4,867,834 | 9/1989 | Alenskis et al. | 156/433 |
| 4,869,774 | 9/1989 | Wisbey | 156/523 |
| 4,877,193 | 10/1989 | Vaniglia | 156/361 X |
| 4,943,337 | 7/1990 | Wisbey | 156/433 |
| 4,978,417 | 12/1990 | Grimshaw et al. | 156/353 X |
| 5,015,326 | 5/1991 | Frank | 156/511 |
| 5,045,147 | 9/1991 | Benson et al. | 156/353 X |
| 5,110,395 | 5/1992 | Vaniglia | 156/353 |

Primary Examiner—David A. Simmons
Assistant Examiner—Paul M. Rivard
Attorney, Agent, or Firm—Jones, Tullar & Cooper

[57] ABSTRACT

An apparatus is disclosed which cuts sheets of resin impregnated fibers and their backer material into tows of precise width and stores them on cassette reels for placement on a tool or mandrel. The placement assembly can place several tows simultaneously from a plurality of tow cassettes attached to the assembly. The tows are passed through a cutting and scrapping assembly which cuts the tows to a precise shape and length as directed by a microprocessor controller and removes tow scraps. After cutting, the backer is removed from the tow and the tow placed on the tool. The backer is then used to drive the following tows individually as directed by the controller. Finally, the backers are delivered to individual backer cassettes for disposal.

15 Claims, 9 Drawing Sheets

FILAMENT CUTTING AND PLACEMENT SYSTEM

BACKGROUND OF THE INVENTION

This invention relates in general to apparatus for cutting and placing tows of resin impregnated composite materials directly on a tool or mandrel and in particular to such an apparatus which provides a means for cutting the tows to a precise and constant width and storing them in a cassette. The cassettes of tows are then loaded into a fiber placement apparatus for placing the tows at a controlled low tension on a tool or mandrel without gaps between the tows or overlapping tows on the tool.

The present systems for applying tows to a mandrel or stationary tool are totally dependent on the quality of the raw tow material supplied. Using current tow manufacturing processes, it is extremely difficult to produce tow material of constant width with a constant degree of resin tack. If the tows are wider than the nominal width, they will be overlapped in the process of applying them to the tool or they may cause jamming of the mechanism of the tow dispensing head. If the tows are narrower the nominal dimension, gaps will occur between the tows. These overlap and gap conditions result in a composite structure that is not uniform in size, shade or integrity, Another problem of the present systems is that of resin buildup on the tow-handling parts of the machine resulting in frequent stopping of the process for cleaning excess resin from the machine. Resin is also a problem in de-spooling the tow material. It may tack to its underlying tows thus fraying them as material is dispensed from the spool. Yet another problem exists in the present apparatus for fiber placement. This problem is that presented by the necessity to cut individual tows during the lay-up process and restart individual tows according to the contour and cross section of the part to be fabricated. Today's apparatus cuts an individual tow at generally a right angle to the direction of tow movement. Thus a gap is formed at the end of the tow and another gap is formed when the tow is restarted. Ideally, the tow should be cut to the exact form of the opening between its adjacent tows in the lay-up thus avoiding gaps and overlaps. Finally, the present systems apply excessive tension on the tows when they are being placed on a tool having concave surface areas causing them to bridge across a portion of the surface of the tool rather than adhering to the tool surface.

SUMMARY OF THE INVENTION

The invention discloses a sheet material of resin impregnated composite fibers having a reinforced backing material. The sheet material is slit into tows of the precise width required. Each tow is wound in a cassette for use in the tow application apparatus.

The tows are applied to a rotating mandrel or to a stationery spool from the supply cassettes and each tow is moved by a drive roller which controls the distance and speed of the tow as it approaches the application roller. Each tow is driven by an individual engagement roller which, when actuated against a drive roller, starts the application of each tow through a microprocessor programmed for the composite structure to be made. A four axis cutter assembly is provided which will cut each tow to the precise shape required to match the structures contour during the lay-up process. Scrap material remaining after cutting the tow is removed and discarded in the process. The backing material on the sheet material is used to align the tows prior to engaging the application roller and then is removed and discarded at the end of the lay-up process by individual backing recovery cassettes. The backing cassettes are controlled by a microprocessor to compensate for the inherent friction in the lay-up assembly process thus reducing the tension on each tow as it is applied to the lay-up surface. All cassettes are mounted on a robotic application head with their tensions controlled by a microprocessor.

DETAILED DESCRIPTION OF THE PREFERRED EMBODIMENT

Figure 1:
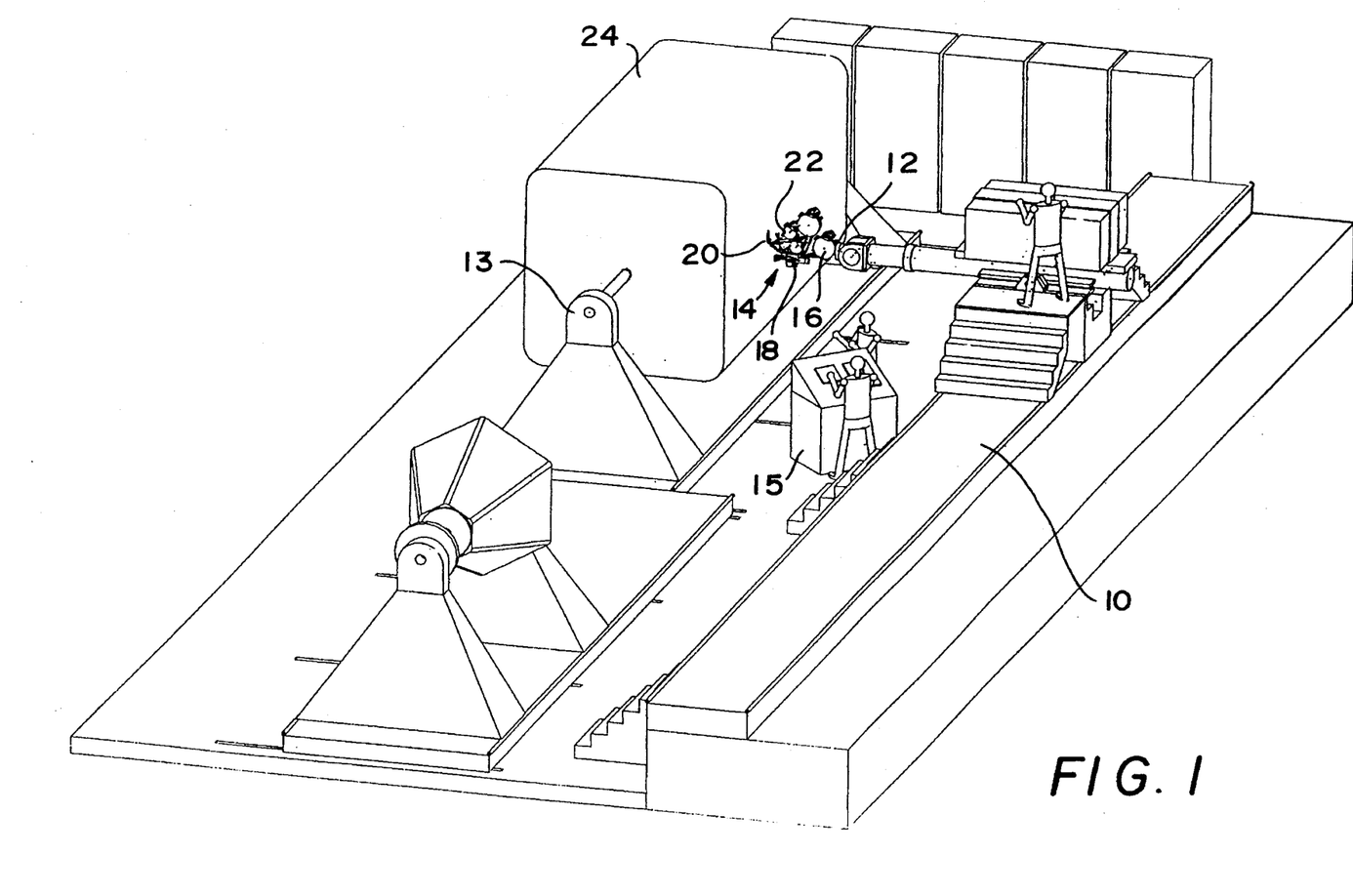
FIG. 1 is an overall isometric view of a machine utilizing the invention.

Referring now to FIG. 1, there is shown an overall elevation of a machine utilizing the invention. The basic machine shown as an example, is a commercially available machine. Such a machine is made by Cincinnati Milicron Inc. in Cincinnati, Ohio. The six axis machine consists of a base 10 and a wrist 12. The tow lay-up assembly 14 is attached to the wrist 12 for movement about its six axes to control the motion of the lay-up assembly. The lay-up assembly consists of a plurality of tow supply cassettes 16, each containing a unitary tow wound on a reel. The cutting and scrapping assembly is shown generally at 18. These assemblies will be described in more detail below in connection with FIGS. 6–8. The tows, cut to their proper length shape, are applied at the application roller 20 to a lay-up tool 24 which is rotatable on a head and tail stock assembly 13. The lay-up process is controlled by the microprocessor 15 which is pre-programmed according to the product being formed.

Figure 2:
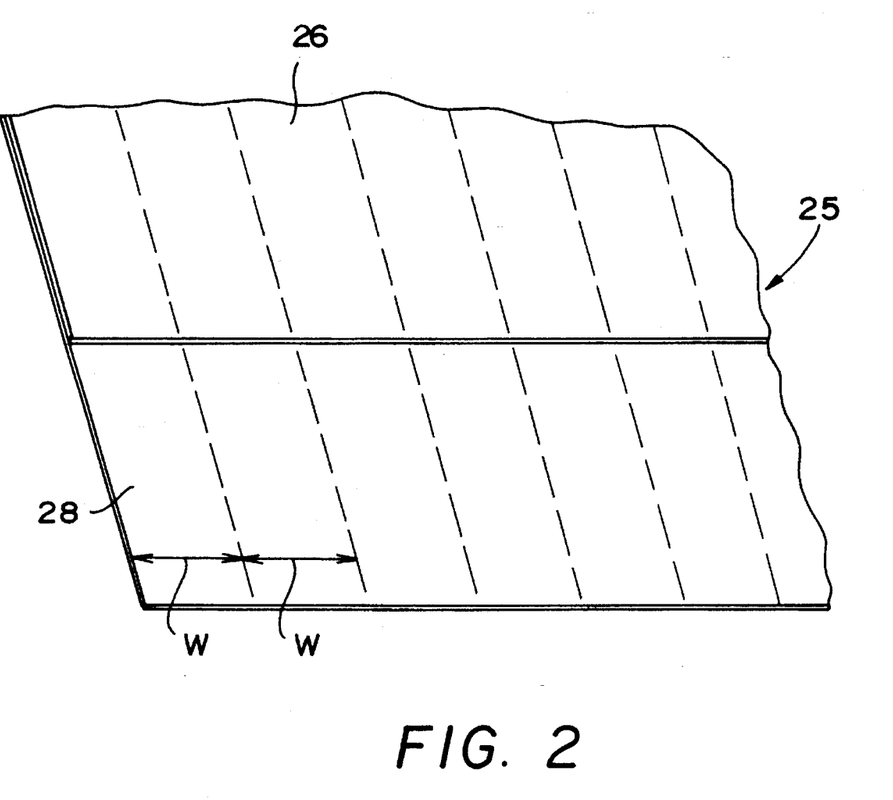
FIG. 2 is a bottom view of the material used in the invention.

Referring now to FIG. 2, there is shown a portion of the resin-impregnated (pre-preg) sheet of fiber 25, used in the operation of the invention. The upper layer 26 consists of uni-directional pre-preg fibers of any type. This layer of pre-preg sheet is adhered to a reinforced backing sheet 28. This backing, which protects the pre-preg from tacking to itself when packaged into a roll configuration, will be easily peeled from the resin coating of the sheet when the fibers are applied to the tool. This backing is a material of sufficient strength and stiffness to allow it to be used to propel the pre-preg fibers and guide them in the lay-up process. The function of the backer will be more fully described in connection with FIGS. 3–8 below.

Figure 3:
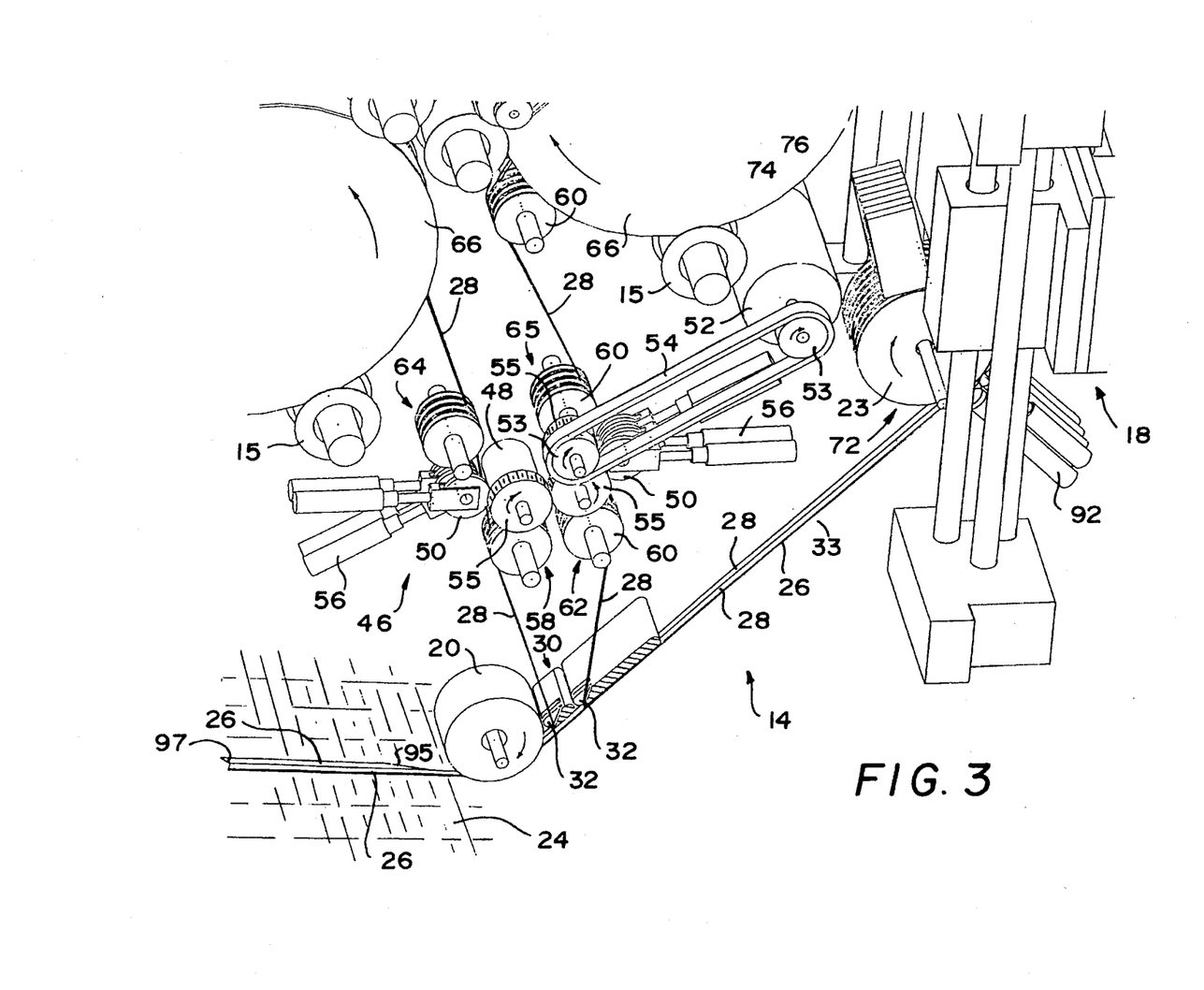
FIG. 3 is an isometric view of the backing material guide assembly, the tow drive assembly and the tow encoder assembly.

Referring now to FIG. 3, there is shown a portion of the sheet material of FIG. 2 which has been slit into an individual tow 33. The backer 28 is shown along with the backer guide assembly 30. The guide assembly 30 has two bodies with a series of slots 32 which are sized to closely fit into the width of the backer. As the backer travels through the assembly, it is peeled away from the unidirectional pre-preg fiber 26. During the peeling action the tow fiber 26 is guided along a straight path to the application roller 20 at a very low tension value which can be accurately controlled by the backer cassette 66. The backer cassettes will be described in more detail in connection with FIG. 6.

Figure 4:
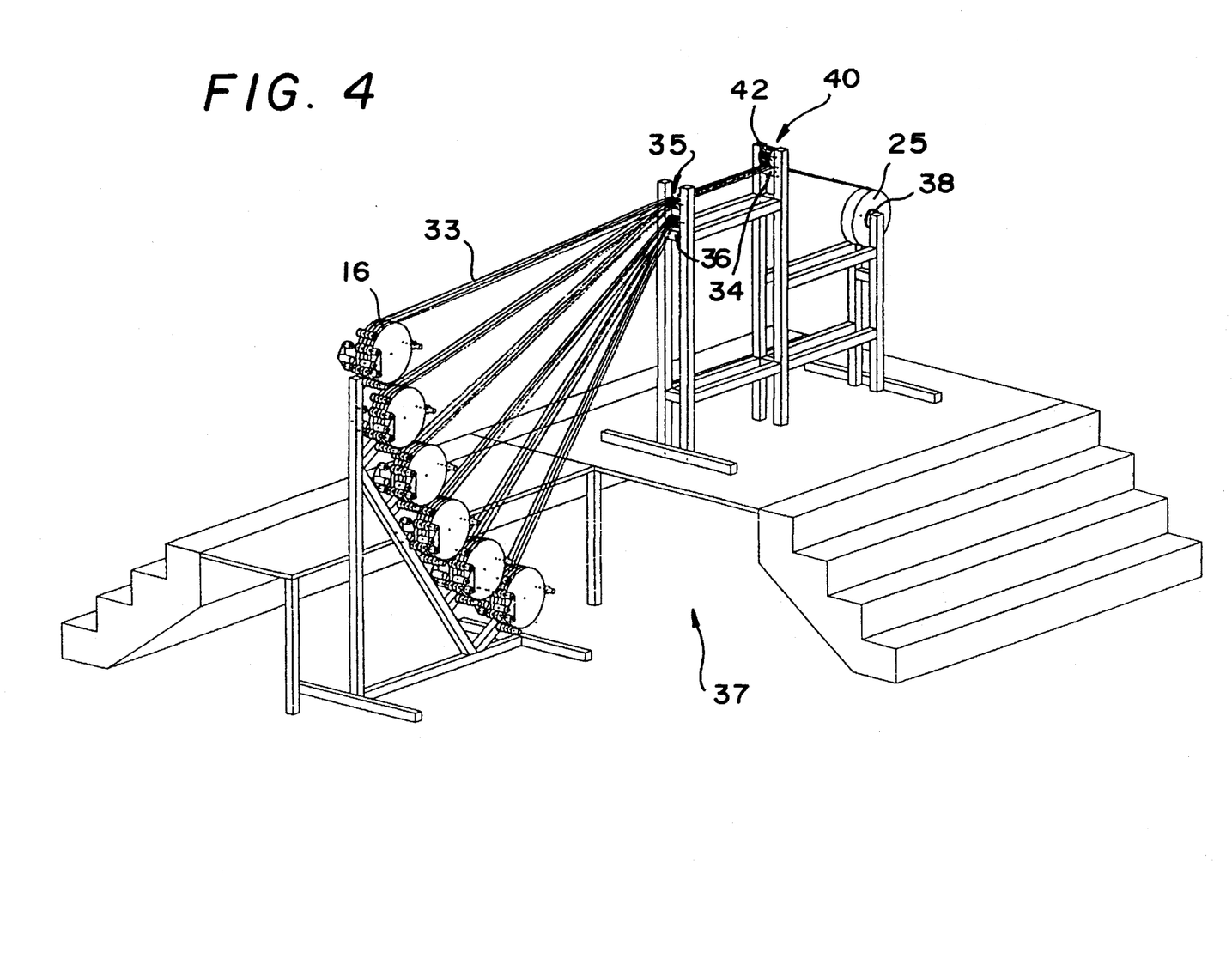
FIG. 4 is an isometric schematic of the material slitting assembly.

Referring now to FIG. 4, there is shown a schematic of the slitting assembly 37 which is used to make the precise tows 33 used in the lay-up process. The slitting process begins with a sheet 25 of the material described in connection with the discussion of FIG. 2 above. The roll of material 25 is mounted on a spindle 38 for rotation. The material 25 is passed over a rubber roller 34. The roller is mounted for rotation on an axle of any known type (not shown). On the top side of the sheet 25 there is provided a slitter blade assembly 40. The blade assembly consists of 24 individual stacked blades 42 described in more detail in connection with FIG. 5. The blade assembly is mounted opposite the rubber roller 34. As the material passes between the roller and the slitter assembly, the sheet 25 is precisely slit into individual tows 33 of width "W" shown in FIG. 2. Typically, the tows are 0125 inches wide.

After slitting, the tows pass over an upper tow guide assembly 35 and a lower tow guide assembly 36. Each assembly consists of individual stacked pulleys 39 which are described in more detain in connection with FIG. 5. Upon exiting the guide assemblies, the tows are separated into two groups for accumulation on the cassettes 16. In the example shown, the tows are grouped in two groups of twelve tows each. Each individual tow is wound on its cassette for use in the lay-up assembly. In this example, a total of twenty four tow cassettes are wound at one time.

Figure 5:
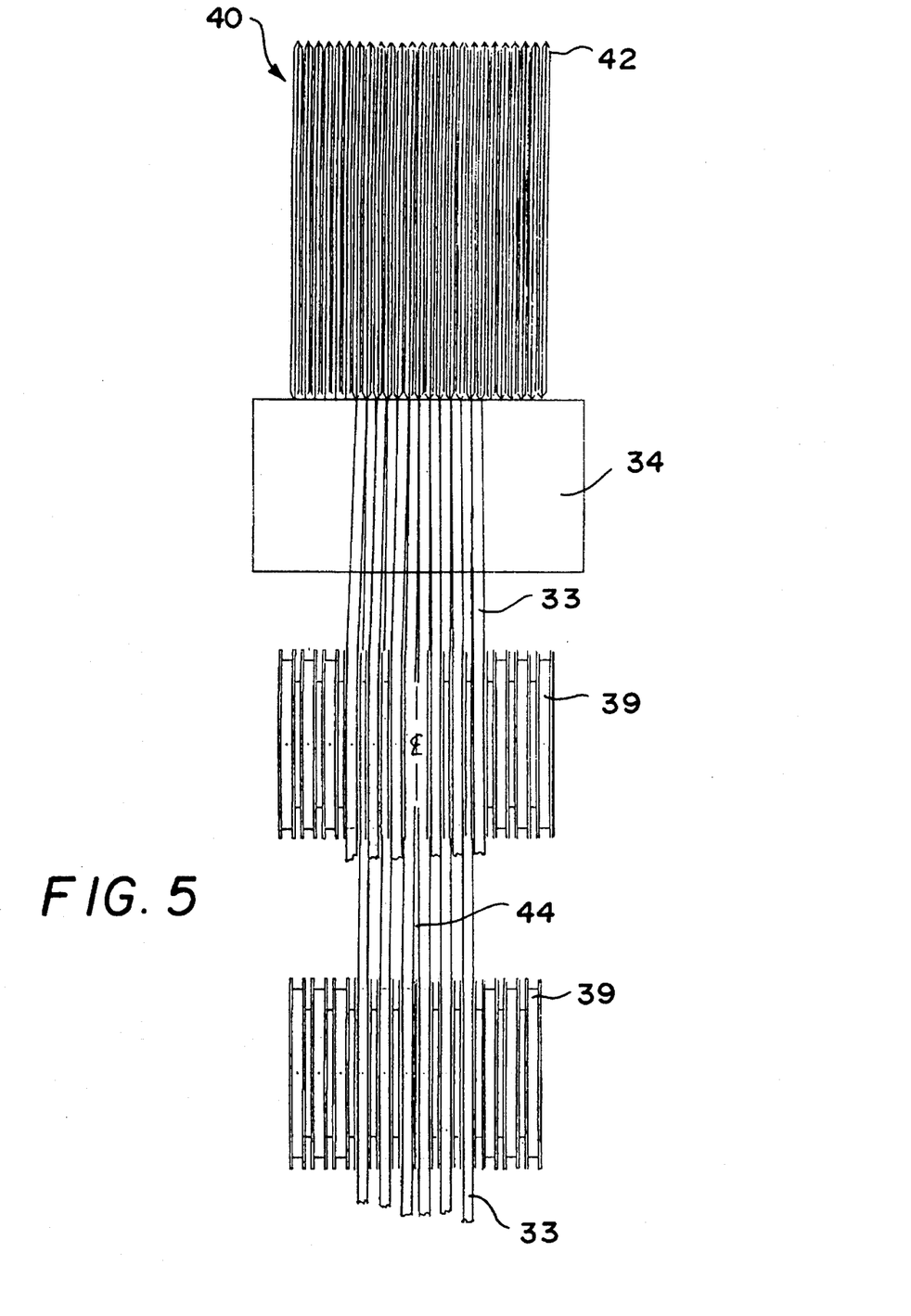
FIG. 5 is a plan view of the slitting assembly tow guides.

Referring now to FIG. 5, there is shown a plan view of the slitting assembly tow guides. The tows proceed through the blades in a linear manner because of the restraint angle 44 imposed by the guide assemblies spaced pulleys on the reinforced backer about the material 25 center line. This causes all of the tows to track properly, thus, all will have the same width and straight and true dimensions.

Figure 6:
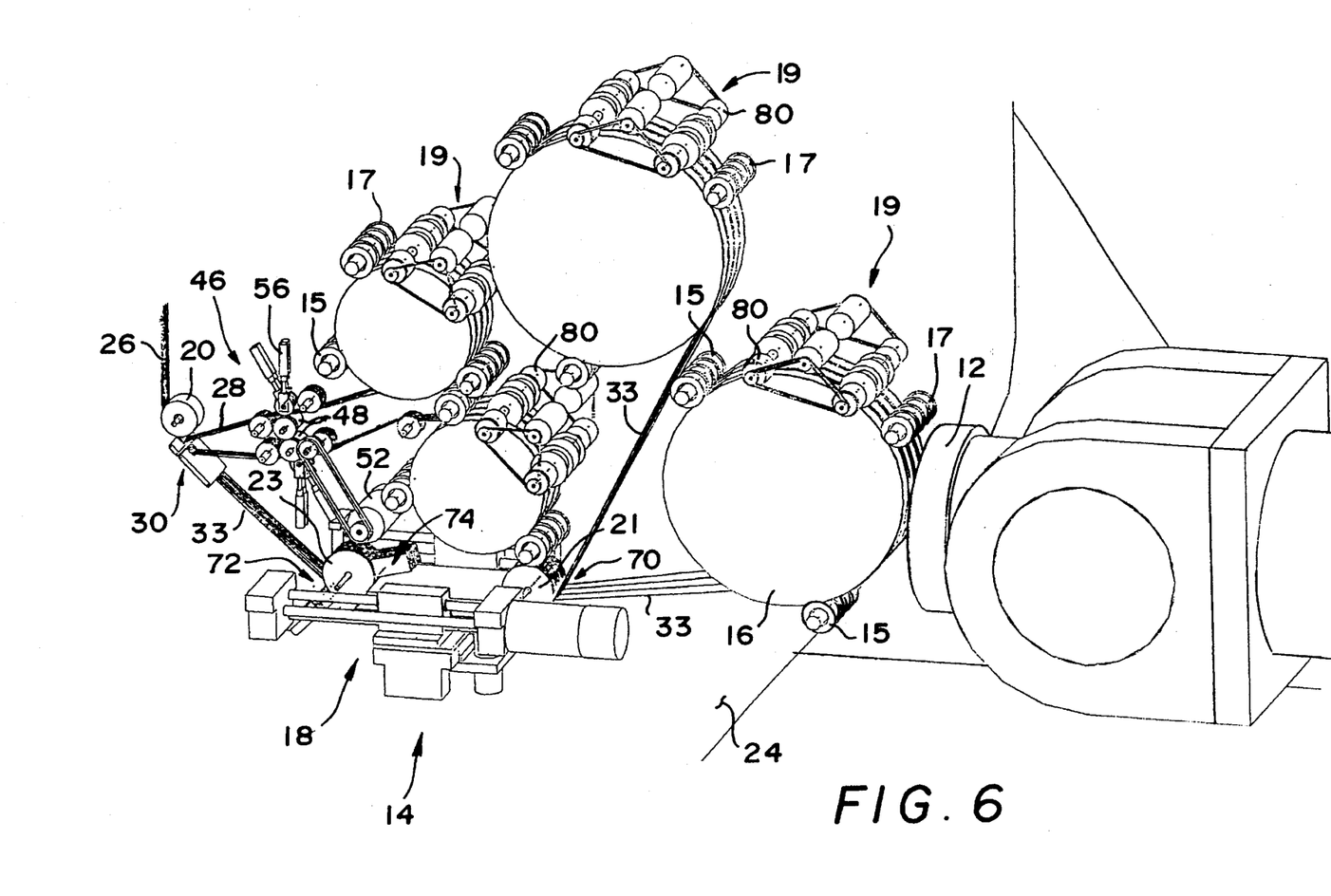
FIG. 6 is an isometric schematic of the tow lay-up assembly of the invention.

Referring now to FIG. 6, there is shown an isometric schematic of the tow lay-up assembly. The tow cassettes 16 produced by the slitter assembly 37, are mounted on the lay-up assembly 14. In the example shown, eight cassettes are used and are arranged in two sets of four. Each cassette has two fixed guide rollers 15 and one moveable guide roller 17. The moveable roller pivots with the tensioner assembly 19 to allow easy loading and unloading of the tow cassettes. These three cassette guide rollers hold the cassettes in the proper position during the lay up process. Once loaded, within the tensioner assembly 19, each cassette has its own individual motorized tensioner 80 which maintains the proper balanced tension on the tow during lay-up. The balanced tension will be described in more detail with the backer take-up cassettes below. The tows 33 are fed from the cassettes 16 over a stack of pulleys 21 shown generally at 70. In the pulley stack, each individual pulley 21 is free to rotate separately from the other pulleys in the stack. The tows are then passed through the cutting and scrapping head 18. This assembly 18 will be described in more detail in connection with FIGS. 7 and 8 below. The tows, after cutting and scrap removal, next pass over a stack of encoder pulleys 23 shown generally at 72. The function of the encoder pulleys will be described in more detail below. The tows then enter the backing guide assembly 30. The backing material is peeled away from the uni-directional pre-preg fibers as the tows pass through the guide assembly. The backing material is directed to a drive assembly 46 and the pre-preg fibers are directed to the application roller. The drive assembly is a commercially available apparatus for example, from Cincinnati Milicron Inc. in Cincinnati Ohio. The application roller is also commercially available from Cincinnati Milicron.

Referring again to FIG. 3, after the tows 26 have been supplied to the application roller and the tool, the backers must be collected for disposal. These backers pass through the drive assembly shown generally at 46. In the example shown, upon entering the drive assembly, the backers (two shown) are divided into two groups. The first group of backers is fed over a stack of pulleys 60 shown generally at 58. The second group of backers is fed over the stack of pulleys shown at 62. In these pulley stacks, each individual pulley is free to rotate separately from the other pulleys in the stack. The drive assembly consists of two drive rollers 48 and two groups of four engagement rollers 50. The two drive rollers are rotated continuously by motor 52 via pulleys 53, belt 54 and gears 55. The engagement rollers are actuated by pneumatic cylinders 56. After passing over pulley stacks 58 and 62, each backer is passed between one of the drive rollers 48 and one of the engagement rollers 50. When the engagement roller is actuated, the backer is pinched between the actuator roller and the drive roller and the backer is driven a distance directed by the microprocessor. The actuation of the engagement rollers is controlled by a micro processor which is coordinated with the cutting and scrapping assembly 18 along with the stack of encoder pulleys 72 and the stack of encoder receivers 74. The coordination of these components will be discussed in more detail below.

After the two groups of backers pass through the drive rollers and engagement rollers, they are fed over a second set of pulley stacks 64 and 65. Again, each individual pulley 60 within a pulley stack is free to rotate separately from the other pulleys in the same stack. The backers are then fed to the backer cassettes 66 for disposal. These cassettes are also held by guide rollers 15 and 17 and are driven by tensioner assemblies 19 with tensioners 80 as are the supply cassettes 16. These tensioners insure the backers are wound in an orderly fashion and are also used to counter balance the inherent friction within the lay-up assembly. Referring back to FIG. 6, in the example shown, these backers are still arranged into two groups for collection in backer cassettes 66.

Figure 7:
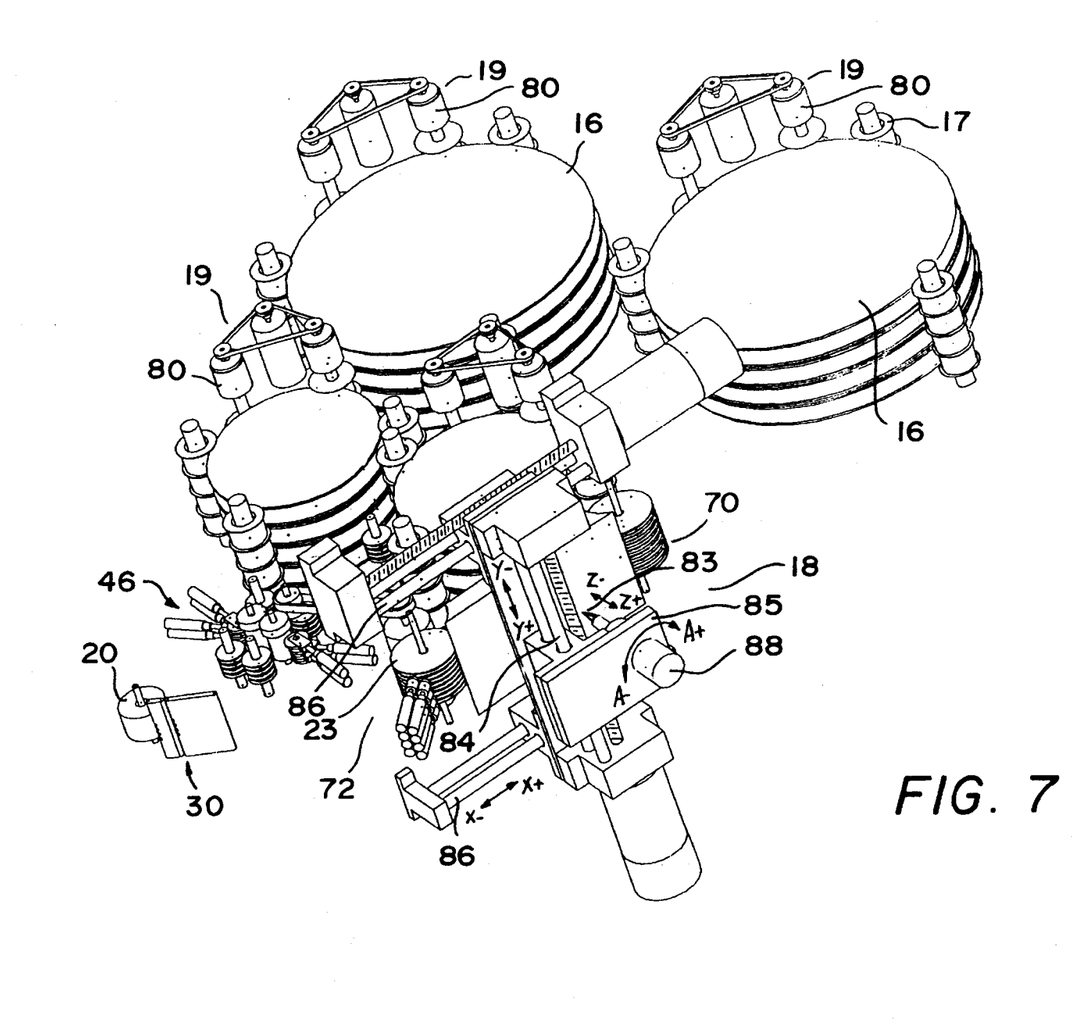
FIG. 7 is an isometric view of the bottom of the tow cutting assembly.

Referring now to FIG. 7, there is shown a bottom view of the cutting portion of the cutting and scrapping assembly 18. The tows pass the entrance pulley stack 70 into the cutting zone of the assembly. The cutter blade 83, is mounted on a cutter base 85 for movement in four axes. It is moved in the "Y" direction along rails 84, in the "X" direction along rails 86 and is rotated ("A" axis) about the "Z" axis by actuator 88. Each tow is cut on the fly at the angle and length according to the instructions of the microprocessor controlling the feed rate of each tow and the feed rate of the four axes of the cutting assembly. When a cut is made, only the unidirectional fibers are cut through leaving the backer in tact.

Figure 8:
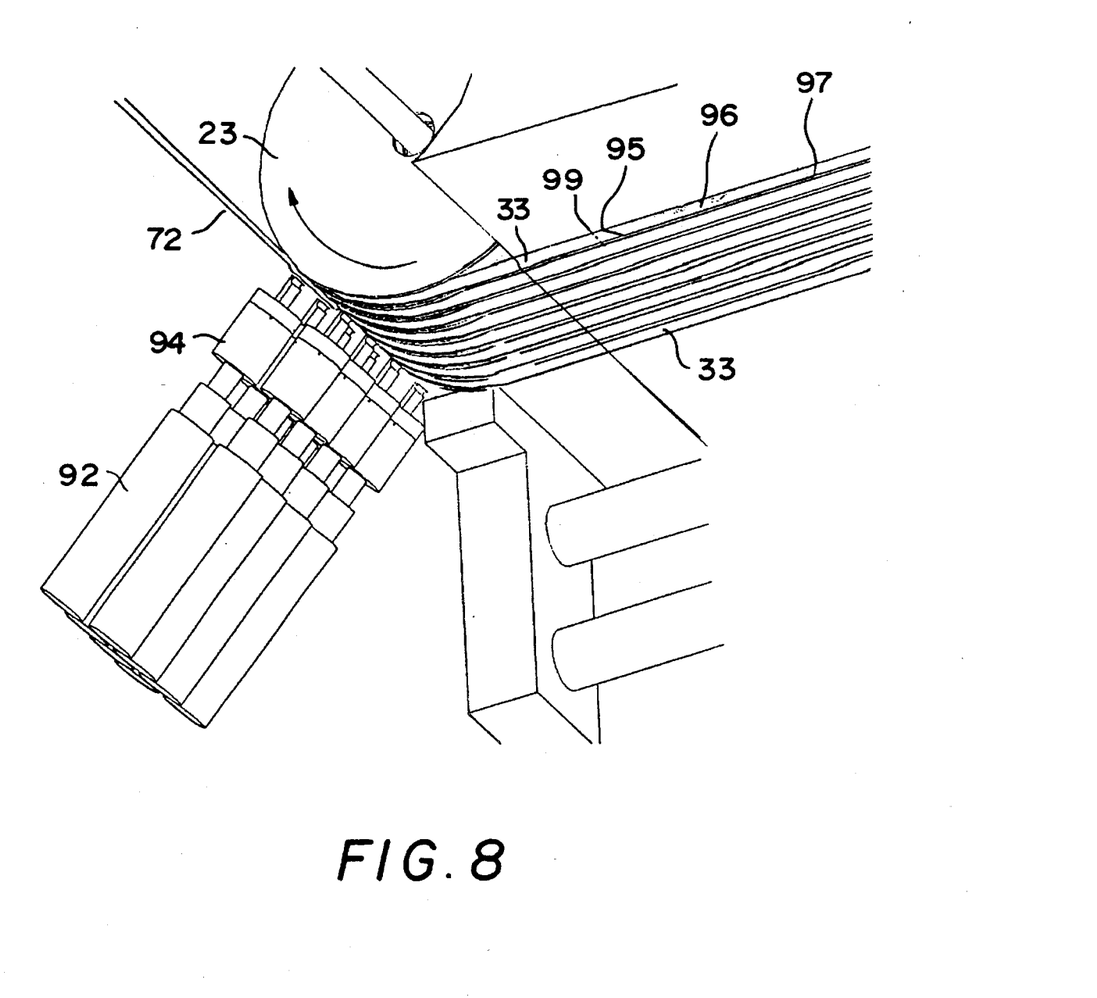
FIG. 8 is a bottom view of the scrap removing assembly.

In FIG. 8, the scrap removal assembly is shown. After the tows pass the cutter, they pass the exit encoder pulley stack 72. If a tow has been cut, the appropriate scrapping blade actuator 92 is energized. This actuator moves a scrapping blade 94 into engagement just prior to the tow's scrap section 96. As shown in the example, this engagement will occur when phantom line 99 is directly below the scrapping blade 94. As the tow wraps around its corresponding encoder pulley 23, the backer follows the path perfectly, however, the unidirectional pre-preg fibers 26 will try to maintain their natural straight path tangent to the pulley surface. Since the end of the tow 95 has had the unidirectional fiber cut through, the beginning of the tow's scrap section 96 will lift slightly away from its backer 28, thus allowing the scrapping blade 94 to get underneath the scrap section. Once underneath, the scrapping blade can be disengaged and continues to peel the remaining portion of the scrap section 96 from the backer until it is freed and discarded. This de-energizing of the scrapping blade is required to prevent the scrapping blade from getting underneath the beginning of the following tow 97 as it wraps around the encoder pulley 23.

Referring back now to FIG. 3, after a tow's fibers are cut in the cutting and scrapping assembly 18, the tow's corresponding encoder pulley is tracked for degrees of rotation by the pulley's encoder receiver 76. As the lay-up assembly 14 moves along the tool 24, the tow's fibers 26 are laid up on the tool and its backer is collected on a cassette 66. The backer 28 and the fibers 26 of the tow 33 continue to move until the tow's end 95 is freed from its backer 28 at or just prior to the backer guide assembly 30. Once freed, the follow-on tow beginning 97 stops and the encoder receiver measures the total degrees of rotation of pulley 23, thus allowing a microprocessor to calculate the exact position of the next tow beginning relative to the point of contact of the application roller 20 with the surface of the tool 24.

In order to restart the beginning of the next tow 97, the engagement roller 50 is energized to pinch the tow's backer against drive roller 48, thus propelling the tow forward again. Through a microprocessor, the engagement roller remains energized until the encoder pulley 23 and the encoder receiver 76 registers enough rotation to equal the remaining calculated distance the tow beginning 97 must travel to reach the tool 24. Once in contact with the tool, the engagement roller 50 is de-energized and the tow 33 will continue to be fed through the lay-up assembly 14 until another tow's end 95 reaches the backer guide assembly 30. This process is repeated for all of the remaining tows during the lay-up process. A microprocessor controls the drive assembly as well as the cutting and scrapping head such that the tows are started towards the lay-up, cut to proper length and shape and the scrap removed before entering the tow backing guide assembly 30. From the backing guide assembly, the tows with the backers removed are fed to the application roller 20 and applied to the tool 24 in the predetermined pattern of the maneuvering machine wrist 12.

Figure 9:
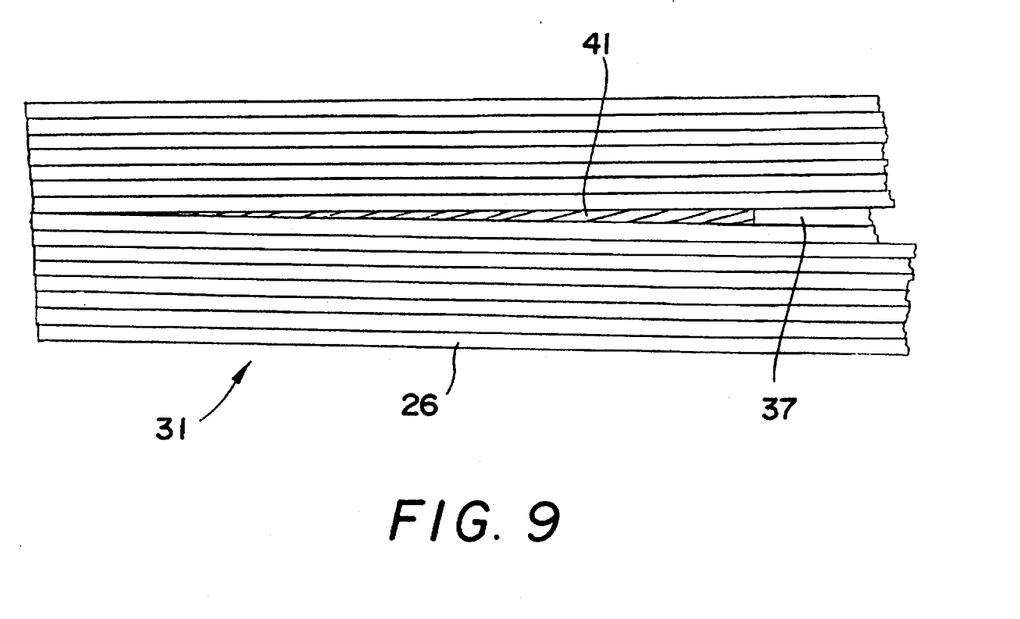
FIG. 9 is a schematic of a typical tow lay-up on the tool.

FIG. 9 illustrates one of the problems solved by this invention. There is shown generally at 31 a portion of a typical tow lay-up using the prior art devices. The tape lay-up is proceeding in the direction of the arrow shown. A series of tows 33 are being laid generally parallel in the lower end of the Figure. Because of the contour of the part being assembled, it is necessary to drop certain tows from the lay-up as the contour changes. There is shown such a tow at 37. This tow has been cut at a right angle to the tow length as done by prior art devices. As can be seen, this manner of cutting produces a triangular gap shown cross hatched as element 41. In the present invention, this tow would be cut in the exact shape of the triangular gap 41 and would fill the lay-up precisely with no overlap or gap in the lay-up. Because of the backer on the tow, each toe is aligned, driven and placed with minimum tension, in the exact path desired thus producing a lay-up of consistent texture and of highest structural integrity.

What is claimed is:

1. Apparatus for continuously cutting and placing tows of resin impregnated fibers on a tool, said fibers being releasably attached to a backer and moving through said apparatus along a flow path, said apparatus comprising:

a plurality of rotatable tow cassette reels of tows for dispensing said tows;

first tow tensioning means attached to said tow cassette reels for maintaining constant tension on said tows during placement on said tool;

a guide pulley assembly, said assembly comprised of a plurality of pulleys individually rotatable on a shaft for guiding each of said tows through said apparatus along the flow path;

tow cutting means for cutting said tows to a predetermined length and shape after said tows exit from said guide pulley assembly;

encoder pulley means for guiding said tows after passing through said cutting means and for determining the position of each of the tow ends when said tows are placed on said tool;

means for removing said backers from said tows and storing said backers on backer cassette reels;

second tow tensioning means attached to said backer cassette reels for controlling the tension on said tows in conjunction with the first tow tensioning means attached to the tow cassette reels, said second tow tensioning means acting in the opposite direction of said first tow tensioning means to minimize the tension on the tow when said tow is placed on said tool;

drive means for driving each of said tows individually in response to a predetermined pattern;

control means for controlling said drive means and said tow cutting means in response to the outputs of both said encoder pulleys and a predetermined pattern installed in the control means; and a tow placement head for receiving the cut tows and placing them on the tool surface.

2. The apparatus according to claim 1 and further comprising means for removing tow scraps from the backers after the tow has been cut.

3. The apparatus according to claim 2 wherein the means for removing tow scraps comprises:

a plurality of scrapping blades, one of said blades being positioned adjacent the under side of each of said tows after said tow has passed said encoder pulley; and an actuator means attached to each of said scrapping blades, each of said actuators being arranged to move its scrapping blade to engage the cut end of said tow and to disengage the cut end of said tow after said tow is separated from said backer member.

4. The apparatus according to claim 1 wherein the tow cutting means comprises a cutter assembly having a blade member adjacent the fiber impregnated tow material, said blade having freedom of movement along at least two orthogonal axes and at least one rotational axis and actuator means for moving said blade member in response to inputs from said control means, said blade being arranged to cut only said tow and leaving said backer member intact.

5. The apparatus according to claim 1 wherein the means for removing said backers from said tows comprises:

a body member lying atop of the tows adjacent to the backers, said body having a plurality of slots for receiving said backers equal to the number of tows in the apparatus and aligned along the flow path of said tows, said slots being formed to direct said backers from the bottom of said body to the top of said body away from the resin impregnated tows; and means for directing said backer members to engagement with said drive means for moving said backer members to said backer cassette reels.

6. The apparatus according to claim 5 wherein said drive means comprises:

a backer guide roller assembly arranged between said means for removing said backers and said drive means comprising a plurality of pulleys individually rotatable on a common axis, each pulley guiding one of said backers;

a drive roller comprising of a plurality of pulleys individually rotatable on a common axis, each pulley serving to drive one of said backers, said drive roller receiving said backers from said guide roller along the flow path;

means for continuously rotating said drive roller;

a plurality of engagement rollers arranged adjacent said drive roller and rotatable on an axis parallel to the rotational axis of said drive roller, one engagement roller being provided for each of the pulleys in said drive roller; and actuator means attached to each of said engagement rollers for moving said engagement rollers in contact with said backers and pressing said backers in contact with said drive roller in response to a signal from said control means and causing said backers to move along the flow path to said backer cassette reel.

7. The apparatus according to claim 1 wherein the control means comprises a microprocessor programmed to control said tow cutting means and said drive means in response to inputs from said encoder pulley whereby the tows are applied to the tool to form the desired product.

8. A cutting and placement apparatus for cutting tows of resin impregnated fibers from a sheet of resin impregnated material having a separable backer adhered to one side of said tow, and for placing said tows on a tool having the shape of the desired end product, said apparatus comprising:

means for cutting said sheet material into tows of precise width and storing said tows in continuous lengths on cassette reels;

a base for supporting said placement assembly;

a tool mounted on said base, said tool having the shape of the product to be formed;

a multi-axis maneuverable head mounted on said base adjacent said tool;

a tow application assembly attached to said maneuverable head and maneuverable therewith, said tow application assembly comprising;

a plurality of rotatable tow cassette reels of tows for dispensing said tows;

first tow tensioning means attached to said tow cassette reels for maintaining constant tension on said tows during placement on said tool;

a guide pulley assembly, said assembly comprised of a plurality of pulleys individually rotatable on a shaft for guiding each of said tows through said apparatus along the flow path;

tow cutting means for cutting said tows to a predetermined length and shape after said tows exit from said guide pulley assembly;

encoder pulley means for guiding said tows after passing through said cutting means and for determining the position of each of the tow ends when said tows are placed on said tool;

means for removing backers from said tows and storing said backers on backer cassette reels;

second tow tensioning means attached to said backer cassette reels for controlling the tension on said tows in conjunction with the first tow tensioning means attached to the tow cassette reels, said second tow tensioning means acting in the opposite direction of said first tow tensioning means to minimize the tension on the tow when said tow is placed on said tool;

drive means for driving each of said tows individually in response to a predetermined pattern;

control means for controlling said drive means and said tow cutting means in response to the outputs of both said encoder pulleys and a predetermined pattern installed in the control means; and a tow placement head for receiving the cut tows and placing them on the tool surface.

9. The apparatus according to claim 8 and further comprising means for removing tow scraps from the backers after the tow has been cut.

10. The apparatus according to claim 9 wherein the means for removing tow scraps comprises:

a plurality of scrapping blades, one of said blades being positioned adjacent the under side of each of said tows after said tow has passed said encoder pulley; and an actuator means attached to each of said scrapping blades, each of said actuators being arranged to move its scrapping blade to engage the cut end of said tow and to disengage the cut end of said tow after said tow is separated from said backer member.

11. The apparatus according to claim 8 wherein the tow cutting means comprises a cutter assembly having a blade member adjacent the fiber impregnated tow material, said blade having freedom of movement along at least two orthogonal axes and at least one rotational axis and actuator means for moving said blade member in response to inputs from said control means, said blade being arranged to cut only said tow and leaving said backer member intact.

12. The apparatus according to claim 8 wherein the means for removing said backers from said tows comprises:

a body member lying atop of the tows adjacent to the backers, said body having a plurality of slots for receiving said backers equal to the number of tows in the apparatus and aligned along the flow path of said tows, said slots being formed to direct said backers from the bottom of said body to the top of said body away from the resin impregnated tows; and means for directing said backer members to engagement with said drive means for moving said backer members to said backer cassette reels.

13. The apparatus according to claim 12 wherein said drive means comprises:

a backer guide roller assembly arranged between said means for removing said backers and said drive means comprising a plurality of pulleys individually rotatable on a common axis, each pulley guiding one of said backers;

a drive roller comprising of a plurality of pulleys individually rotatable on a common axis, each pulley serving to drive one of said backers, said drive roller receiving said backers from said guide roller along the flow path;

means for continuously rotating said drive roller;

a plurality of engagement rollers arranged adjacent said drive roller and rotatable on an axis parallel to the rotational axis of said drive roller, one engagement roller being provided for each of the pulleys in said drive roller; and actuator means attached to each of said engagement rollers for moving said engagement rollers in contact with said backers and pressing said backers in contact with said drive roller in response to a signal from said control means and causing said backers to move along the flow path to said backer cassette reel.

14. The apparatus according to claim 8 wherein the control means comprises a microprocessor programmed to control said tow cutting means and said drive means in response to inputs from said encoder pulley whereby the tows are applied to the tool to form the desired product.

15. The apparatus according to claim 8 wherein said means for cutting said tows comprises:

a compliant roller mounted on a spindle for rotation about an axis therewith;

a slitter comprising a plurality of circular blades mounted on a spindle for rotation about an axis therewith, said blades being spaced apart on said spindle an amount equal to the desired width of the individual tows said slitter spindle axis arranged parallel to the axis of the spindle of the compliant roller, said blades being in contact with said compliant roller, said sheet of resin impregnated material and its backer being directed to pass between said compliant roller and said slitter;

a guide roller assembly mounted on a spindle for rotation therewith about an axis parallel to the axes of the spindles of said compliant roller and said slitter for guiding said tows to individual cassette reels, said guide roller comprising a plurality of individual pulleys providing one pulley for each tow, said pulleys being spaced apart to separate said tows for insertion into said cassette reels.

* * * * *